(12) United States Patent
Schneider et al.

(10) Patent No.: US 12,534,387 B2
(45) Date of Patent: Jan. 27, 2026

(54) WATER SUPPLY AND DISTRIBUTION SYSTEM ON-BOARD AN AIRCRAFT AND METHOD FOR OPERATING SUCH SYSTEM WITH LOW MAINTENANCE EFFORT

(71) Applicant: Airbus Operations GmbH, Hamburg (DE)

(72) Inventors: Frank Schneider, Hamburg (DE); Hannes Müller, Hamburg (DE); Axel Schreiner, Bremen (DE); Tim Lübbert, Wedel (DE); Frederik Albers, Ahlerstedt (DE); Michael Rempe, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 347 days.

(21) Appl. No.: 18/238,053

(22) Filed: Aug. 25, 2023

(65) Prior Publication Data
US 2024/0083770 A1    Mar. 14, 2024

(30) Foreign Application Priority Data
Aug. 29, 2022   (EP) ..................... 22192704

(51) Int. Cl.
*C02F 1/00*   (2023.01)
*B64D 11/02*  (2006.01)

(52) U.S. Cl.
CPC ............. *C02F 1/001* (2013.01); *B64D 11/02* (2013.01); *C02F 2201/001* (2013.01)

(58) Field of Classification Search
CPC .... C02F 1/001; C02F 2201/001; B64D 11/02; B64D 11/04; B01D 61/081; B01D 2313/48; B01D 2313/50; B64F 5/40
See application file for complete search history.

(56) References Cited

U.S. PATENT DOCUMENTS

| 5,261,440 A | * | 11/1993 | Frank ..................... | B64D 11/02 |
|   |   |   |   | 137/208 |
| 5,303,739 A | * | 4/1994 | Ellgoth .................. | B64D 11/02 |
|   |   |   |   | 137/341 |

(Continued)

FOREIGN PATENT DOCUMENTS

EP    3385361 A1    10/2018

OTHER PUBLICATIONS

European Search Report for Application No. 22192704 dated Feb. 20, 2023.

*Primary Examiner* — Terry K Cecil
(74) *Attorney, Agent, or Firm* — KDW Firm PLLC (57) ABSTRACT

A method for operating an on-board water supply and distribution system of an aircraft for supplying water includes a central tank, consumer assemblies with a supply device and a buffer tank, pump operable in a supply mode and reverse mode, filter device, and high-pressure conduit system. The central tank connects to the pump's upstream side. The conduit system connects the downstream side and consumer assemblies. The pump in supply mode delivers water from the downstream side to the buffer tank. In reverse mode, the pump can convey water from the downstream side to the upstream side. The method includes operating the pump in supply mode so water from the central tank goes to a consumer assembly in a first time interval to fill the buffer tank, and operating the pump in reverse mode in a second time interval so water from the buffer tank passes through the filter device.

15 Claims, 3 Drawing Sheets

(56) References Cited

U.S. PATENT DOCUMENTS

| | | |
|---|---|---|
| 9,273,449 B2 | 3/2016 | Burd |
| 10,822,774 B2 * | 11/2020 | Lübbert ................. B64D 11/02 |
| 2003/0189002 A1 | 10/2003 | Proulx |
| 2006/0169645 A1 * | 8/2006 | Hsueh ................... C02F 1/4674 |
| | | 210/739 |
| 2010/0237021 A1 | 9/2010 | Guttau |
| 2012/0111432 A1 * | 5/2012 | Harr ....................... B64D 11/02 |
| | | 137/590 |
| 2014/0102553 A1 | 4/2014 | Burd |
| 2017/0021295 A1 | 1/2017 | Willems |
| 2017/0226726 A1 | 8/2017 | Schless |
| 2019/0365936 A1 | 12/2019 | Flashaar |

* cited by examiner

WATER SUPPLY AND DISTRIBUTION SYSTEM ON-BOARD AN AIRCRAFT AND METHOD FOR OPERATING SUCH SYSTEM WITH LOW MAINTENANCE EFFORT

TECHNICAL FIELD

The disclosure herein is directed to a method for operating a water supply and distribution system on-board an aircraft. The disclosure herein is further directed to a water supply and distribution system and an aircraft comprising such system.

BACKGROUND

Conventional water supply and distribution systems on-board commercial aircraft comprise pipework made from rigid pipes, i.e., rigid plumbing. Through the rigid pipes potable water is supplied from a central water tank to consumer assemblies such as sinks and toilets in a lavatory or steam ovens and sinks in a galley. Such conventional supply systems offer sufficient robustness against foreign particles contained in potable water, i.e., the devices and components normally employed in such systems are not prone to damage from the concentration and size of particles contained in the water supplied to the central water tank and then delivered to the consumer assemblies. Filter units are only optionally installed in a decentral manner into monuments in order to protect sensitive consumer assemblies (in particular galley inserts GAINS), such as coffee makers or steam ovens, from being adversely affected by particles and thus to extend their service life. Thereby filter cartridges are used that have to be replaced at regular maintenance intervals (cartridges with different filter effects are available).

However, recently a high-pressure water system was introduced and it is described in EP 3 385 361 A1. Such industry-optimized water system architecture is based on the concept of a reduction of pipe cross-sections accompanied by an increase in pressure-level as well as a change of pressurization technology, i.e., rather than employing pressurized central water tanks and centrifugal pumps, displacement pumps are used, by other types of pumps may also be used in such high-pressure systems. This adaption allows massive savings, e.g., weight, installation time, equipment cost etc., but at the same time it leads to a higher sensitivity against any kind of foreign particles or deposits. In particular, the higher sensitivity requires the implementation of a filter device upstream the high-pressure section with e.g. the displacement pump. The filter device protecting the water system from particles, turbidity, etc. These substances remain on the upstream side of the filter and accumulate there.

The filter device in turn involves the following disadvantages. There is additional maintenance effort for replacing or cleaning the filter cartridges, or water filters with reduced maintenance effort have a complex design which in turn results in an increase of weight. Moreover, the system performance is continuously decreasing due to filter-cake formation which reduces the pressure and flow of water through the filter and the pump.

SUMMARY

Thus, it is an object of the disclosure herein to provide a method for operating an on-board water supply system in an aircraft as well as such system which allow to operate the system for a long period of time without a significant reduction in performance and the need for significant maintenance efforts.

The object underlying the disclosure herein is solved by the subject matter disclosed herein.

In particular, in a first aspect of the disclosure herein, the above object is solved by a method for operating an on-board water supply and distribution system of an aircraft for supplying water. The system comprises a central water tank and a plurality of consumer assemblies. Each consumer assembly comprises a supply device and a buffer tank, and each consumer assembly is configured to supply water from the buffer tank via the supply device.

With regard to the consumer assemblies, it is to be noted that in the method of the disclosure herein a consumer assembly may comprise not just a sole supply device but may also be provided with a plurality of supply devices so that a sole buffer tank supplies the plurality of supply devices with water by a micro pump or gear pump. There is a single conduit connecting this consumer assembly with the pump of the system as further discussed in the following. Thus, the disclosure herein is not limited to consumer assemblies where each buffer tank is associated with only a single supply device.

Further, as already indicated the system comprises a pump having an upstream side and a downstream side and being configured such that it may operate in a supply mode and a reverse mode. In a preferred embodiment the pump is configured as a positive displacement pump and further preferred as a gear pump. The downstream side of the pump is connected to the high-pressure conduit system that connects the downstream side to the plurality of consumer assemblies. The conduit system being configured such that the pump, when operating in the supply mode, is capable of delivering water from its upstream side to the buffer tank of each of the consumer assemblies. When the pump is operating in the reverse mode, it is capable of conveying water from the downstream side to the upstream side.

Moreover, the system comprises a filter device which protects the water system from particles, turbidity, etc. A filter device improves the quality of water by removing or reducing the concentration of particles such as turbidity or microorganisms or other undesirable substances dissolved in the water. The filter device used may preferably be a sieve filter. More preferably, the filter device may comprise a combination of several filter stages or filter principles. In any case, the respective substances remain on the upstream side of the filter and accumulate there. The central water tank is connected to the upstream side of the pump with the filter device being arranged between the central water tank and the upstream side.

The method of the disclosure herein comprises the following steps:

operating the pump in the supply mode so that water from the central tank is delivered to at least one of the consumer assemblies in a first time interval wherein the buffer tank of the at least one consumer assembly is filled, and operating the pump in the reverse mode in a second time interval so that water from the buffer tank of the at least one of the consumer assemblies passes through the filter device.

Hence, with the method according to the disclosure herein the system on-board an aircraft comprising a central water tank, a pump and a plurality of consumer assemblies such as sinks and toilets in a lavatory or steam ovens and sinks in a galley, is operated in the first step in a manner where the buffer tanks of the consumer assemblies are supplied with water from the central water tank, the water passing the filter device so that both the pump and the consumer assemblies are prevented from getting into contact with particles having a size larger than the pore size of the filter device. In this first step, it is preferred that the buffer tanks are filled completely or at least up to a certain level. In particular, it is preferred, that level sensors are provided in the buffer tanks which are connected with a control unit of the system so that the level up to which the buffer tanks are filled, may be controlled by the control unit.

Furthermore, in particular during time periods where there is no demand for water at the consumer assemblies and especially when the aircraft is on the ground, then the pump is operated in the reverse mode, so that water from the buffer tanks is drawn to the pump and pushed through the filter device in a direction opposite to the normal flow during the first step. In this second "backwash" step particles that have been accumulated on the upstream side of the filter device are removed and then pushed back preferably towards the central water tank or, in another preferred embodiment, to the fill/drain coupling provided in the connection between the filter device and the central water tank.

Thus, the method according to the disclosure herein allows to clean the upstream side of the filter device after a relatively short period of normal use so that the amount of particles which have accumulated in the filter device may be kept at a relatively low level which in turn results only in a minor reduction of the performance of the system. In addition, the efforts which have to be made to clean the filter device are rather small and the cleaning step for the filter device can automatically be initiated. In particular, it is not required that any parts of the system are replaced during the aforementioned cleaning step, so that no maintenance personal has to be involved.

In a preferred embodiment, where the system is provided with a fill/drain coupling in the connection between the central water tank and the filter device, an outlet valve is provided on the fill/drain coupling, the outlet valve having a closed and an open position. When the pump is operated in the supply mode, the outlet valve is in the closed position, i.e., it is controlled such that it is in the closed position, and when the pump is operated in the reverse mode, the outlet valve is preferably in the open position, i.e., it is also controlled such that it is preferably in the open position. In this preferred embodiment water contaminated with particles from the upstream side of the filter device is automatically pushed out of the system via the fill/drain coupling, whereas when the system is operated in the normal way with the pump operating the supply mode, water from the central tank is conveyed to the consumer assemblies by the pump. However, it is also conceivable and within the scope of the disclosure herein that in the second step where the pump is operated in the reverse mode, water which is drawn through the filter, is further conveyed into the central water tank with the outlet valve being in the closed position. This latter mode of operation in which water contaminated with the filter cake is initially stored in the main tank, is advantageous when the temperatures in the surroundings of the aircraft are so low, that ice formation would take place.

Finally, it is also to be noted that the filter device may be configured such that it comprises a separate filter outlet connected to the upstream side of the filter device so that during the backwash-step when the pump is operated in the reverse mode water containing particles accumulated on the upstream side of the filter device are expelled via the filter outlet.

In a further preferred embodiment, the buffer tank of each of the at least one consumer assembly comprises an inlet being connected with the downstream side of the central pump via the high pressure conduit system, and an outlet connected the supply device of the at least one consumer assembly. The inlet is arranged at a distance in the vertical direction from a bottom of the buffer tank, whereas the outlet is arranged in the bottom of the buffer tank. Such configuration of the buffer tanks enables a complete drainage of water and a transport of sediments and particles out of the buffer tanks which is a prerequisite for a hygienic water supply. On the other hand, the arrangement of the inlet at a higher level prevents that during operation of the pump in the reverse mode sediments and particles having accumulated at the bottom of the buffer tanks are conveyed towards the downstream side of the pump and the downstream side of the filter device where they could cause damage.

In a further preferred embodiment, a signal is generated being a measure of the flow rate of water through the filter device, when the pump is operated in the supply mode, and when the signal is outside a predetermined range, the pump is switched from the supply mode to the reverse mode, so that the pump is operated in the reverse mode for the second time interval. In this preferred embodiment the flow rate across the filter device is monitored, and in case it drops below a certain threshold, the reverse mode of the pump would be activated so as to remove at least parts of the filter cake on the upstream side of the filter device and, hence, to reduce the flow resistance of the filter device.

In this regard it is to be noted, that it is not required that the flow rate is measured directly. Instead, it is sufficient that a signal is constantly monitored which is merely a measure of the flow rate, and in case the signal is outside a predetermined range that corresponds to a flow rate which is acceptable, the reverse mode of the pump is activated. Here, it is further to be noted that the activation of the reverse mode is not necessarily initiated immediately upon the detecting that the signal has left predetermined range. It is also conceivable that there is a delay between the detection and the activation of the reverse mode.

In this embodiment it is further preferred that the pressure drop is detected between the side of the filter device being connected with the central water tank, i.e., the upstream side of the filter device, and the side of the filter device being connected with the upstream side of the pump, i.e. the downstream side of the filter device, and that the signal is generated based on the detected pressure drop.

In another aspect of the disclosure herein the above object is solved by an on-board water supply and distribution system of an aircraft for supplying water, which system comprises a central water tank, a plurality of consumer assemblies, each consumer assembly comprising a supply device and a buffer tank and each consumer assembly being configured to supply water from the buffer tank via the supply device, a pump having an upstream side and a downstream side and being configured such that it may operate in a supply mode and a reverse mode, a filter device, a high pressure conduit system, and a control unit.

As already indicated above in the system of the disclosure herein a consumer assembly may comprise not just a sole supply device. Instead, it but may also be provided with a plurality of supply devices so that a sole buffer tank supplies the plurality of supply devices with water and a single conduit connects such consumer assembly with the pump of the system, so that the disclosure herein is not limited to consumer assemblies where each buffer tank is associated with only a single supply device.

The central water tank is connected to the upstream side of the pump with the filter device being arranged between the central water tank and the upstream side. Further, the conduit system connects the downstream side with the plurality of consumer assemblies, with the conduit system being configured such that the pump, when operating in the supply mode, is capable of delivering water from the downstream side to the buffer tank of each of the consumer assemblies. When the pump is being operated in the reverse mode, it is capable of conveying water from the downstream side to the upstream side.

The control unit is connected to the pump and being configured such that it operates the pump in the supply mode in a first time interval so that water from the central tank is delivered to at least one of the consumer assemblies wherein the buffer tank of the at least one consumer assembly is filled, and operates the pump in the reverse mode in a second time interval different from the first time interval so that water from the buffer tank of at least one of the consumer assemblies passes through the filter device. Preferably, the control unit operates the pump in such a way that in the first time interval the buffer tank of the at least one consumer assembly is filled completely.

Hence, the system of the disclosure herein is also configured such that it can be operated in a first mode, where the buffer tanks of the consumer assemblies are supplied with water from the central water tank, and a second mode where the pump is operated in the reverse mode so that the upstream side of the filter may be cleaned and particles accumulated thereon are removed.

Thus, the system of the disclosure herein provides for the same advantages as the above-described method. The same applies to the preferred embodiments of the system as disclosed herein.

In another preferred embodiment, the filter device comprises a filter outlet on the upstream side of the filter which in a further preferred embodiment is provided with a filter outlet valve. Further, in this preferred embodiment the filter device may be arranged such that it is at a lower level than the central pump and the central water tank when the aircraft provided with the water supply and distribution system of the disclosure herein is in a horizontal position. With this latter configuration it is achieved that any water being present in the conduits between the filter device and the central tank and the central pump, respectively, may automatically be dumped via the filter outlet without employing further pump means.

Finally, the above object is also solved by an aircraft comprising a system as described before.

BRIEF DESCRIPTION OF THE DRAWINGS

In the following, the disclosure herein will be described further with regard to the example embodiment shown in the drawings, wherein.

DETAILED DESCRIPTION

As can be taken from FIGS. 1 and 2 the example embodiment of a water supply and distribution system 1 is generally arranged on-board an aircraft 3 and configured such that it supplies a plurality of consumer assemblies 5 such as sinks and toilets in a lavatory or steam ovens and sinks in a galley, with potable water as will be described in detail below. FIG. 2 only schematically shows the arrangement of the system 1 in the aircraft 3, and several types of arrangements are conceivable.

The water supply and distribution system 1 comprises a central water tank 7 which is provided with a connector 9 at its bottom, and the connector 9 being connected to a supply line 11 which is arranged in this example embodiment in such a manner in the aircraft 3 that it includes an angle α with the horizontal 13 when the aircraft 3 is on the ground and in a horizontal position, and generally the supply line 11 is inclined downwards to a fill/drain coupling 15 which is provided with a valve 17 and which is arranged at the free end of the supply line 11. The valve 17 is connected to a control unit 19 of the system 1 and can remotely be controlled such that it can be switched between a closed and an open position.

Figure 1:
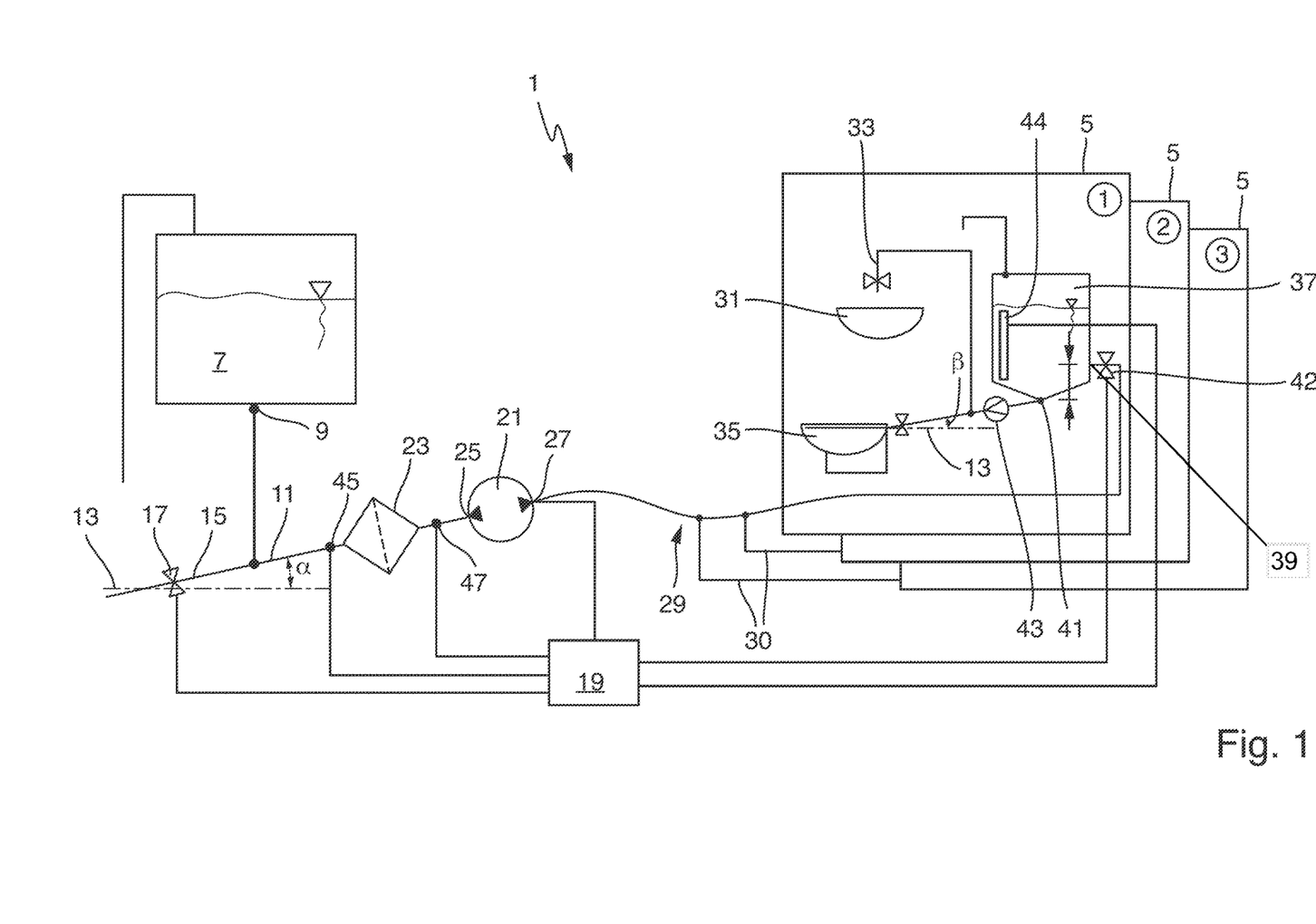
FIG. 1 shows a schematic drawing of an example embodiment of an on-board water supply and distribution system of an aircraft.
Figure 2:
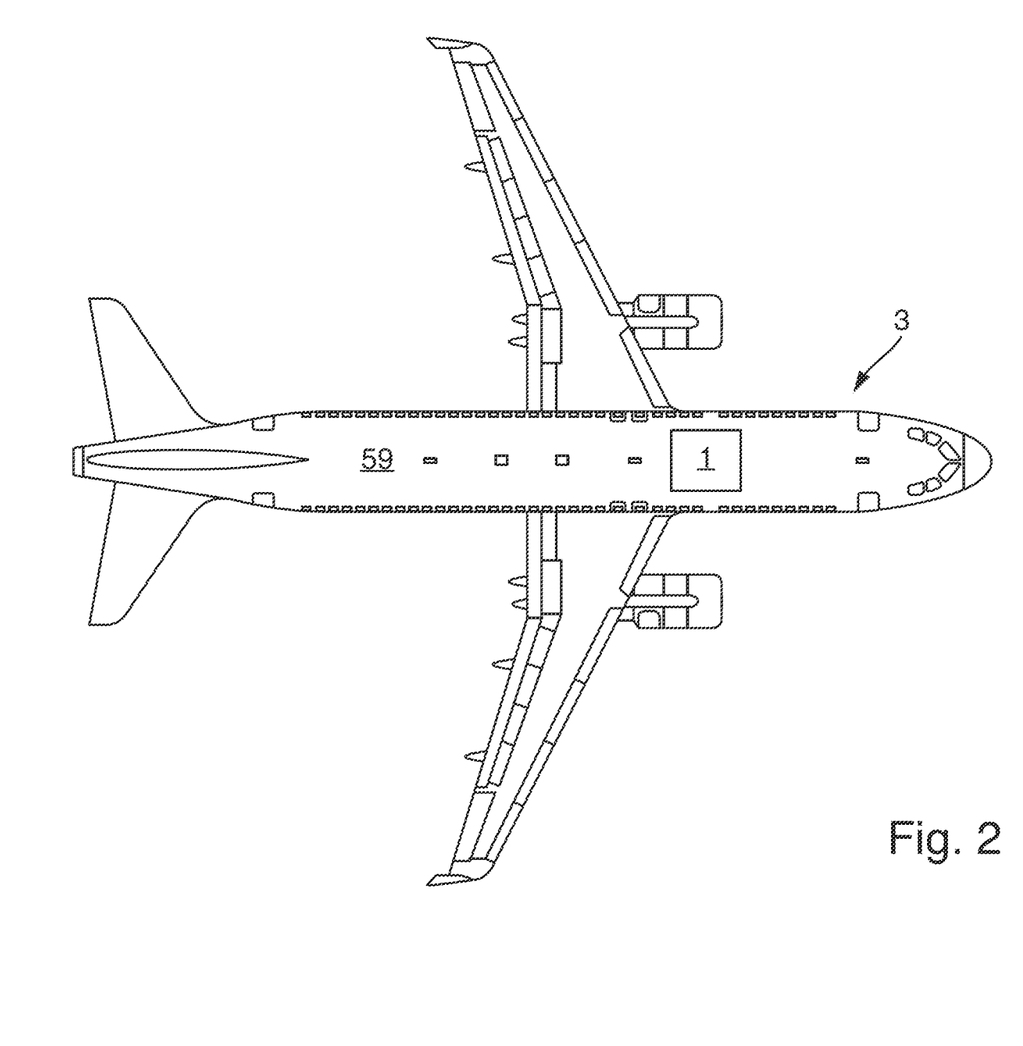
FIG. 2 shows an example embodiment of an aircraft having on-board water supply and distribution system of FIG. 1.

As can further be taken from FIG. 1, the supply line 11 connects the fill/drain coupling 15 with a central pump 21 wherein a filter device 23 is arranged in the supply line 11 between the connection to the central water tank 7 and the central pump 21. Preferably, the central pump 21 is configured as a positive displacement pump and further preferred as a gear pump. The filter device 23 improves the quality of water by removing or reducing the concentration of particles such as turbidity or microorganisms or other undesirable substances dissolved in the water. The filter device 23 may preferably in the form of a sieve filter. More preferably, the filter device 23 may comprise a combination of several filter stages or filter principles.

Furthermore, the central pump 21 is also connected to the control unit 19 and can be operated in a supply mode where it conveys water from its upstream side 25 and the supply line 11 to its downstream side 27 that is connected to a high-pressure conduit system 29 which will be described in detail below.

The high-pressure conduit system 29 comprises a plurality of conduits 30 connecting the downstream side 27 of the central pump 21 with the consumer assemblies 5. Moreover, the central pump 21 may also be operated in a so-called reverse mode in which it draws water from its downstream side 27 and conveys it to its upstream side 29 and towards the supply line 11.

The consumer assembly 5 shown in FIG. 1 is configured as a lavatory with a sink 31 provided with a faucet 33 and a toilet 35 as supply devices. Here, it is to be noted that other forms of consumer assemblies are conceivable such as galleys having sinks etc. and that the disclosure herein is not limited to consumer assemblies in the form of lavatories. In particular, since galleys are provided with buffer tanks that have a larger capacity than those of lavatories, the buffer tanks of galleys may play a more important role in the method of the disclosure herein, as will become clear below.

Furthermore, the consumer assembly 5 comprises a buffer tank 37 having an inlet 39 and an outlet 41, the inlet 39 being provided with an inlet valve 42 which is connected to the control unit 19 so that the position of the valve 42 can be controlled by the control unit 19. The outlet 41 is connected to the faucet 33 and the toilet 35 via a micro pump 43. As can further be taken from FIG. 1, in this preferred embodiment the line connecting the outlet 41 with the toilet 35 is also inclined downwards and in this example embodiment includes an angle β with the horizontal 13, when the aircraft 3 is horizontally arranged on the ground. In general, the outlet 41 is arranged at a higher level than the toilet 35. This ensures that when the valve of the toilet 35 is open, the buffer tank 37 may completely be emptied via the toilet 35. However, it is also conceivable that when such configuration with a supply device at a lower level than the outlet of the buffer tank cannot be achieved a pneumatic drainage process is conducted, to empty the buffer tank.

Finally, the buffer tank 37 is provided with a level sensor 44 which is connected to the control unit 19 and configured such that it provides a signal to the control unit 19 indicating the fill level in the buffer tank 37.

Furthermore, the inlet 39 of the buffer tank 37 is connected to the downstream side of the central pump 21 via the high-pressure conduit system 29 including the conduits 30. When the aircraft 3 is on the ground, the inlet 39 is arranged at a distance in the vertical direction from the bottom of the buffer tank 37 with the outlet 41. This arrangement of the inlet 39 has the effect that when water is drawn out of the buffer tank 37 via the inlet 39 by the central pump 21 when being operated in the reverse mode, the buffer tank 37 cannot entirely be emptied and particles which have sedimented at the bottom of the buffer tank 37 are not drawn out of the tank 37 and conveyed towards the pump 21. Instead, these particles can only be removed from the buffer tank 37 via the outlet 41.

As apparent from the above the consumer assemblies 5 comprise not just a sole supply device. Instead, several supply devices are provided and connected with a sole buffer tank 37 which supplies the supply devices with water and the single conduit 30 connecting the consumer assembly 5 with the pump 21 of the system.

Finally, in this example embodiment the filter device 23 is provided with a device to monitor the pressure drop between the upstream side and the downstream side of the filter device 23. In this preferred embodiment the monitoring device for the pressure drop comprises a first pressure sensor 45 and a second pressure sensor 47, the first sensor 43 being arranged upstream the filter device 23 whereas the second sensor is arranged downstream the filter device 23 at the side pointing towards the central pump 21. Each of the sensors 43, 45 are connected to the control unit 19 which is configured such that during operation of the central pump 21 in the supply mode, it collects the signals generated by the sensors 43, 45 so as to generate a further signal representative of the pressure drop across the filter device 23 and, hence, the flow rate across the filter device 23. When this further signal is outside a predetermined range representing a normal condition of the filter device 21 resulting in an acceptable flow rate, the control unit 19 will activate the reverse mode of the central pump 21. However, this activation of the reverse mode may not necessarily take place immediately upon detection that the further signal has left the predetermined range. It is also conceivable that the reverse mode will be activated with a certain delay or when the aircraft 3 has reached a condition where no demand for water in the consumer assemblies 5 can be expected, e.g., when the aircraft is on the ground. However, it is also conceivable that the filter backwash step is performed during flight at time periods in which only small fresh water demands are expected.

The control unit 19 of the system 1 is configured such that it operates the system 1 and especially the central pump 21 in this example embodiment in the following manner:

In a first step during a first time interval the length of which is not fixed, the central pump 21 is constantly or intermittently operated in the supply mode so that water from the central tank 7 is delivered to the consumer assemblies 5 and their buffer tanks 37, which are connected to the downstream side 27 of the pump 21 via the high pressure conduit system 29, so that the buffer tanks 37 of the at least one consumer assembly are filled. In particular, in this step the inlet valves 42 of those consumer assemblies 5 the buffer tanks 37 of which shall be filled are at the same time or a subsequently brought into its open position. The level in the buffer tanks 37 may be monitored by the level sensors 44.

In this example embodiment, during this first step the outlet valve 17 on the fill/drain coupling 15 is kept in the closed position by the control unit 19, and the control unit 19 generates the further signal representative of the flow rate of water through the filter device 21 from the signals of the first and second pressure sensors 45, 47, which signals are representative for the pressure drop across the filter device 21 from which it can be concluded to the respective flow rate. The control unit 19 is further configured such that it monitors this further signal and when it is outside the predetermined range representative of an acceptable flow rate through the filter device 21, it is switched, optionally with a delay, to the second step.

In this respect, it is to be noted that other criteria to initiate the second step may be applied. In particular, it is conceivable that the second step is initiated when:
- a predetermined number of flight cycles since last backwash has been detected,
- a threshold for operational hours of the pump/system since last backwash is exceeded,
- a predetermined time period since last backwash is exceeded,
- the time for filling a buffer is above predetermined limit value, or
- a threshold for the pumped water volume, i.e., the maximum flow generated by the pump, since last backwash is exceeded. Additionally, suitable combinations of these criteria may also be applied, and it is also conceivable that the backwash step may manually be initiated regardless of whether any of the above criteria are fulfilled.

In the second step the central pump 21 is operated in the reverse mode by the control unit 19 for a second time interval. When being operated in the reverse mode and when the inlet valve 42 of at least one of the filled buffer tanks 37 is being brought in the open position by the control unit 19, the central pump 21 draws water from the buffer tanks 37 of the consumer assemblies 5 towards its downstream side 27 and conveys it to its upstream side 25. When the level sensor 44 of the respective buffer tank 37 indicates that the level in tank is below the level of the inlet 39, the inlet valve 42 of this tank 37 is closed by the control unit 19 and the inlet valve 42 of another tank 37 previously being filled is opened.

In the preferred embodiment described herein the water is further conveyed through the fill/drain coupling 15 with the valve 17 being brought into the open position by the control unit 19. However, it is also conceivable that during the step of operating the pump 21 in the reverse mode, water is conveyed from the buffer tanks 37 to the central water tank 7 with the valve 17 being in the closed position.

Figure 3:
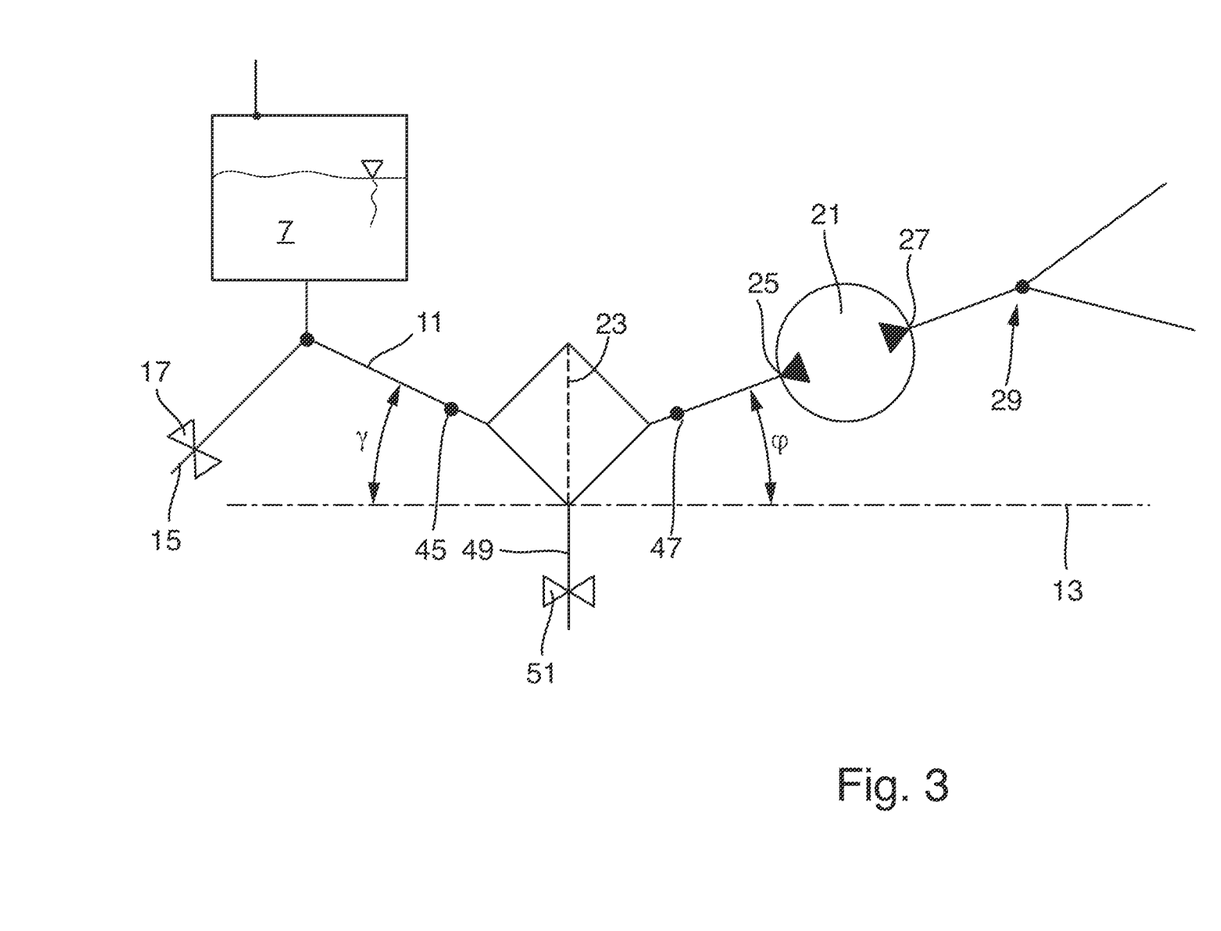
FIG. 3 shows the section with the filter device of another embodiment of the section of on-board water supply and distribution system.

In FIG. 3 the section with the filter device 23 of a second embodiment of a water supply and distribution system 1 for an aircraft is shown. This embodiment is almost identical to the above-described embodiment and differs only in the configuration and the arrangement of the filter device 23. It can be seen in FIG. 3 that different from the above-described embodiment the filter device 23 comprises a filter outlet 49 which connects the upstream side of the filter device 23 where particles etc. are accumulated and the filter cake is formed, with the outside. Further, in the conduit of the filter outlet 49 a filter outlet valve 51 is provided which is also connected to the control unit 19 and configured such that it can be switched between an open position and a closed position by the control unit 19. Similar to the aforementioned embodiment first and second pressure sensors 45, 47 are provided on the upstream and the downstream side, respectively of the filter device 23, so that also in this embodiment the flow rate across the filter device 23 may be determined by the control unit 19.

Furthermore, as schematically shown in FIG. 3 the filter device 23 is arranged such in the supply line 11, that the sections of the supply line 11 connecting the filter device 23 with the central water tank 7 and the upstream side 25 of the central pump 21 are inclined, so that the filter device 23 is at a lower level than both the upstream side 25 of the central pump 21 and the connector 9 of the central water tank 7. In particular, both of these sections include an angle $\gamma$ with the horizontal 13. With this arrangement of the sections of the supply line 11 it is achieved that when the filter outlet valve 51 is in the open position water within the sections of the supply line 11 connecting the filter device 23 with the central water tank 7 and the central pump 21 automatically flows out of the filter outlet 49.

The second embodiment of a water supply and distribution system is operated almost in the same manner as the first embodiment. However, when the central pump 21 is operated in the reverse mode, the filter outlet valve 51 is controlled such by the control unit 19 that it is in the open position, so that in the backwash-step water containing the filter cake is expelled via the filter outlet 49 and not guided it to the central water tank or the fill/drain coupling 15.

Thus, the method according to the disclosure herein allows to clean the upstream side of the filter device 23 after relatively short periods of normal use so that the amount of particles which have accumulated in the filter device 23 may be kept at a relatively low level. Hence, only in a minor reduction of the performance of the system 1 occurs between the subsequent cleaning steps applied on the filter device 23.

In addition, the efforts which have to be made to clean the filter device 23 are rather small. In particular, cleaning step for the filter device is automatically initiated by the control unit 19. Finally, it is not required that any parts of the system 1 are replaced during the aforementioned cleaning step, so that no maintenance personal will be involved.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for operating an on-board water supply and distribution system of an aircraft for supplying water, the system comprising:
   a central water tank;
   a plurality of consumer assemblies, each consumer assembly comprising a supply device and a buffer tank and each consumer assembly being configured to supply water from the buffer tank via the supply device;
   a pump having an upstream side and a downstream side and being configured to operate in a supply mode and a reverse mode;
   a filter device; and
   a high-pressure conduit system;
   wherein the central water tank is connected to the upstream side of the pump with the filter device being arranged between the central water tank and the upstream side,
   wherein the high-pressure conduit system connects the downstream side with the plurality of consumer assemblies, with the conduit system being configured for the pump, when operating in the supply mode, to deliver water from the downstream side to the buffer tank of each of the consumer assemblies,
   wherein, when the pump is operating in the reverse mode, the pump can convey water from the downstream side to the upstream side,
   the method comprising:
   operating the pump in the supply mode so that water from the central tank is delivered to at least one of the consumer assemblies in a first time interval wherein the buffer tank of the at least one consumer assembly is filled; and
   operating the pump in the reverse mode in a second time interval so that water from the buffer tank of the at least one of the consumer assemblies passes through the filter device.

2. The method according to claim 1, wherein during operating the pump in the reverse mode, water is conveyed from the buffer tank of the at least one of the consumer assemblies to the central water tank.

3. The method according to claim 1, the system further comprising a fill/drain coupling between the central water tank and the filter device, and
   wherein, when the pump is operated in the reverse mode, water from the buffer tank of at least one of the consumer assemblies passes through the fill/drain coupling.

4. The method according to claim 3, the system comprising an outlet valve on the fill/drain coupling, the outlet valve having a closed and an open position,
   wherein, when the pump is operated in the supply mode, the outlet valve is in the closed position, and
   wherein, when the pump is operated in the reverse mode, the outlet valve is in the open or in the closed position.

5. The method according to claim 1, wherein the buffer tank of each of the at least one consumer assembly comprises an inlet connected to the downstream side of the central pump via the high pressure conduit system and an outlet connected to the supply device of the at least one consumer assembly,
   wherein the inlet is arranged at a distance in a vertical direction from a bottom of the buffer tank, and
   wherein the outlet is in the bottom of the buffer tank.

6. The method according to claim 1, wherein, when the pump is operated in the supply mode, a signal is generated being a measure of a flow rate of water through the filter device, and
   wherein, when the signal is outside a predetermined range, the pump is switched from the supply mode to the reverse mode to be operated in the reverse mode for the second time interval.

7. The method according to claim 6, wherein a pressure drop between a side of the filter device connected with the central water tank and a side of the filter device connected with the upstream side of the pump is detected; and
   wherein the signal is generated based on the detected pressure drop.

8. An on-board water supply and distribution system of an aircraft for supplying water, the system comprising:
   a central water tank;
   a plurality of consumer assemblies, each consumer assembly comprising a supply device and a buffer tank and each consumer assembly being configured to supply water from the buffer tank via the supply device;
   a pump having an upstream side and a downstream side and being configured to operate in a supply mode and a reverse mode;
   a filter device;
   a high-pressure conduit system; and
   a control unit;
   wherein the central water tank is connected to the upstream side of the pump with the filter device being arranged between the central water tank and the upstream side,
   wherein the conduit system connects the downstream side with the plurality of consumer assemblies, with the conduit system being configured such for the pump, when operating in the supply mode, to deliver water from the downstream side to the buffer tank of each of the consumer assemblies,
   wherein, when the pump is operating in the reverse mode, the pump can convey water from the downstream side to the upstream side,
   the control unit being connected to the pump and being configured such that it:
   operates the pump in the supply mode in a first time interval so that water from the central tank is delivered to at least one of the consumer assemblies wherein the buffer tank of the at least one consumer assembly is filled; and
   operates the pump in the reverse mode in a second time interval different from the first time interval so that water from the buffer tank of at least one of the consumer assemblies passes through the filter device.

9. The system according to claim 8, wherein the system is configured such that when the pump is operating in the reverse mode, water is conveyed from the buffer tank of the at least one of the consumer assemblies to the central water tank.

10. The system according to claim 8 comprising a fill/drain coupling between the central water tank and the filter device,
   wherein the system is configured such that, when the pump is operated in the reverse mode, water from the buffer tank of at least one of the consumer assemblies passes through the fill/drain coupling.

11. The system according to claim 10 comprising an outlet valve on the fill/drain coupling, the outlet valve having a closed and an open position and being operatively connected to the control unit,
   wherein, the control unit is further configured such that:
   when the control unit operates pump in the supply mode, the outlet valve is in the closed position, and
   when the pump is operated in the reverse mode, the outlet valve is in the open position.

12. The system according to claim 8, wherein the buffer tank of each of the at least one consumer assembly comprises an inlet connected with the downstream side of the central pump via the high pressure conduit system and an outlet connected to the supply device of the at least one consumer assembly,
   wherein the inlet is arranged at a distance in a vertical direction from a bottom of the buffer tank, and
   wherein the outlet is in the bottom of the buffer tank.

13. The system according to claim 8, comprising a detection device connected to the control unit and configured to generate a signal being a measure of the flow rate of water through the filter device, and
   wherein the control unit is configured such that, when the signal is outside a predetermined range, the pump is switched from the supply mode to the reverse mode to be operated in the reverse mode for the second time interval.

14. The system according to claim 13, wherein the detection device is configured to detect a pressure drop between a side of the filter device connected with the central water tank and a side of the device connected with the upstream side of the pump, and
   wherein the detection device is configured such that the signal is generated based on the detected pressure drop.

15. An aircraft comprising a system according to claim 8.

* * * * *